United States Patent [19]
Foster et al.

[11] Patent Number: 5,253,350
[45] Date of Patent: Oct. 12, 1993

[54] METHOD OF COMBINING LOWER ORDER AND TRANSLATED UPPER ORDER BITS TO ADDRESS ROM WITHIN A RANGE RESERVED FOR OTHER DEVICES

[75] Inventors: Mark J. Foster, Stevensville; Babu Rajaram, St. Joseph; Anthony M. Olson, Stevensville, all of Mich.

[73] Assignee: Zenith Data Systems Corporation, Buffalo Grove, Ill.

[21] Appl. No.: 555,778

[22] Filed: Jul. 19, 1990

Related U.S. Application Data

[63] Continuation of Ser. No. 114,781, Oct. 30, 1987, abandoned.

[51] Int. Cl.[5] .................... G06F 12/00; G06F 12/02; G06F 12/06
[52] U.S. Cl. .................... 395/400; 395/425; 365/230.01; 365/230.06; 364/955.6; 364/956.4; 364/965.8; 364/970.5; 364/245.31; 364/246.9; 364/255.8; 364/256; 364/DIG. 1
[58] Field of Search ............... 364/200, 900 MS File; 365/230.06, 230.01; 395/400, 425

[56] References Cited

U.S. PATENT DOCUMENTS

| | | | |
|---|---|---|---|
| 4,407,016 | 9/1983 | Bayliss et al. | 364/200 |
| 4,774,652 | 9/1988 | Dhuey et al. | 364/200 |
| 4,849,875 | 7/1989 | Fairman et al. | 364/200 |
| 4,868,738 | 9/1989 | Kish et al. | 395/400 |
| 5,109,521 | 4/1992 | Culley | 395/800 |

Primary Examiner—Thomas C. Lee
Assistant Examiner—Paul Harrity
Attorney, Agent, or Firm—Leydig Voit & Mayer

[57] ABSTRACT

In response to an address decoded in a preselected range, a multiplexer combines translated high order address bits with CPU-generated low order address bits to access random access memory, especially reserved range random access memory. Otherwise, the multiplexer merely combines CPU-generated low order bits with CPU-generated high order address bits to access RAM. An expanded memory specification memory map drives the translator to generate the translated high order address bits. This generates the address for reserved range RAM. RAM contents, normal and reserved range, are available for processing by the CPU.

7 Claims, 2 Drawing Sheets

| $M_{19}$ | $M_{18}$ | $M_{17}$ | $T_{19}$ | $T_{18}$ | $T_{17}$ |
|---|---|---|---|---|---|
| 0 | 0 | 0 | 1 | 1 | 0 |
| 0 | 0 | 1 | 1 | 0 | 1 |
| 0 | 1 | 0 | 1 | 0 | 0 |

METHOD OF COMBINING LOWER ORDER AND TRANSLATED UPPER ORDER BITS TO ADDRESS ROM WITHIN A RANGE RESERVED FOR OTHER DEVICES

This application is a continuation of application Ser. No. 114,781, filed Oct. 30, 1987 now abandoned.

BACKGROUND OF THE INVENTION

The present invention relates generally to the computer art. More particularly, the present invention relates to accessing memory in a personal computer. Specifically, the present invention provides a technique for accessing memory, the physical address of which is located within a reserved range of addresses in a personal computer.

As is well known, a typical personal computer system may have a total memory range capability of one megabyte. Of this total range, a certain smaller range has come to be known as a reserved range. The reserved range is not available for use as system random access memory (RAM), but is reserved for providing the central processing unit (CPU) with direct access to specialized hardware such as video memory or to specialized permanent code stored in read only memory (ROM). The reserved range typically occupies the upper address range of from either 512 or 640 kilobytes up to one megabyte.

Some personal computer systems are, for reasons of speed, constructed with a 32-bit wide data transfer bus. For reasons of economy, such systems use thirty-two 256-kilobit dynamic RAM integrated circuit components, or the equivalent of one megabyte of physical RAM, even though the use of such components provides more physical memory than is necessary to fill the maximum allowable capacity for system RAM. Therefore, since only the first 512 or 640 kilobytes are usable as system RAM, the remainder has heretofore been unusable as being mapped within the reserved range.

Although this typical computer system performs satisfactorily at an acceptable level of cost, it suffers from the consequence of possessing certain physical RAM hardware while being unable to use it. As processing speed and software development costs are related to the amount of usable memory in a computer system, a further consequence is slower speed and greater cost than would be possible if such memory were usable.

Accordingly, a principal object of the present invention is to provide a technique for accessing reserved range RAM which generally overcomes the deficiencies of the prior art.

A more detailed object of the present invention lies in providing a method of using previously unusable RAM which increases the overall system operating speed and reduces attendant software development costs.

A further object lies in providing a method for mapping reserved range RAM that accommodates a system RAM limit of either 512 or 640 kilobytes.

Yet another related object lies in providing a method for mapping reserved range RAM in accordance with an expanded memory specification.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

DETAILED DESCRIPTION OF THE INVENTION

The present invention accomplishes the above and other objects through a method of mapping reserved range RAM to an expanded memory map. The invention uses hardware normally used to implement the Expanded Memory Specification (EMS) industry standard (developed by Lotus, Intel and Microsoft and officially called the Lotus/Intel/Microsoft Expanded Memory Specification; employed in Intel's own memory board design using this specification and known as "Above Board." This specification is referred to throughout the instant application simply as "EMS".), but adds a translator which enables the system to accommodate RAM located anywhere in the reserved range. In the method of the present invention, the CPU generates an address which is interpreted to be an EMS access, and the translator receives and operates upon the standard EMS mapping information in order to generate a usable address which corresponds to the physical location of available reserved range RAM in the computer system. In the preferred procedure, the translator inverts the standard EMS mapping information in order to readily accommodate a system RAM limit of either 512 or 640 kilobytes, and offsets the mapping information to account for the presence of specialized ROM located in the upper 128 kilobytes of the reserved range.

Figure 1:
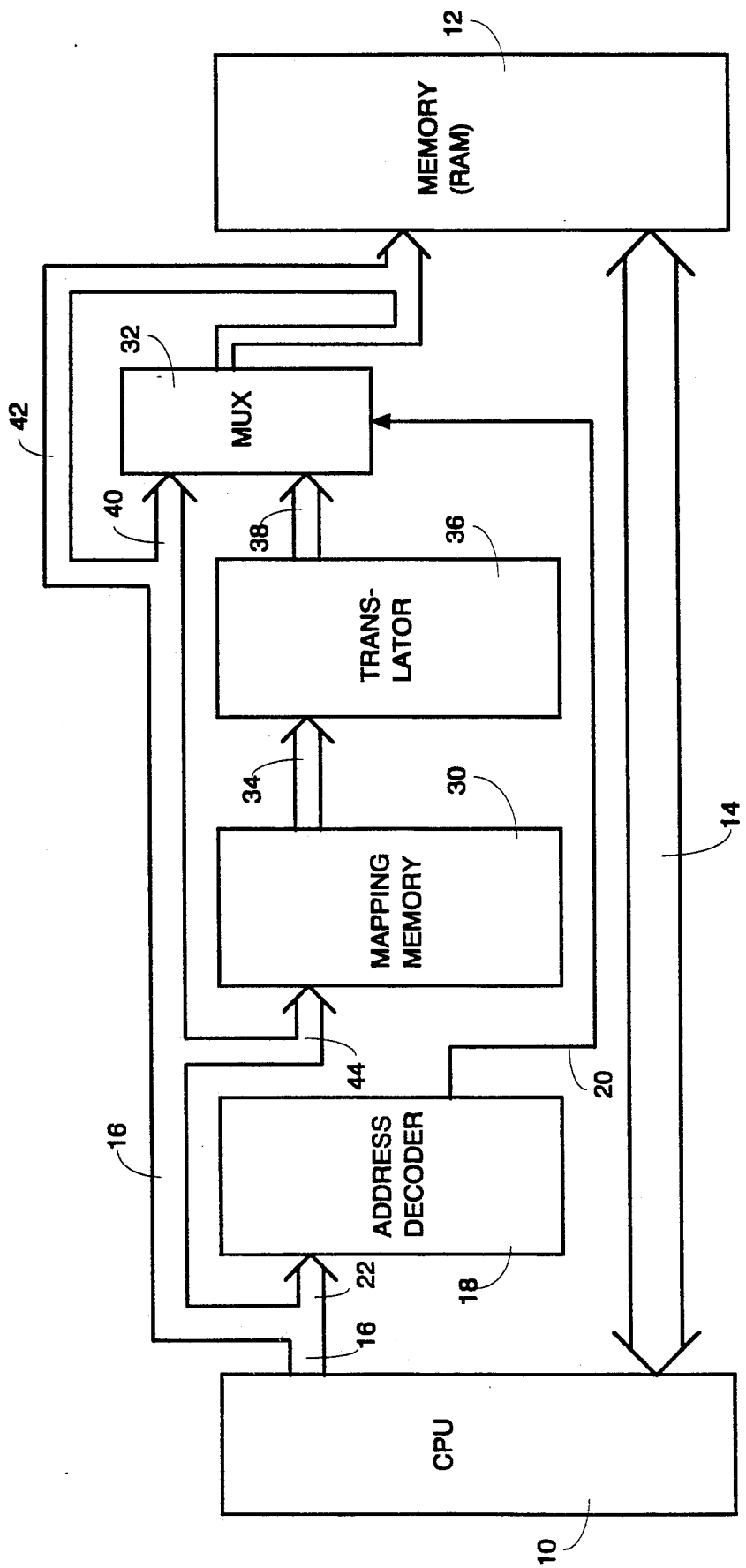
FIG. 1 is a general hardware block diagram of a personal computer system according to the present invention.

Referring now to the drawings, FIG. 1 illustrates a general block diagram of a personal computer system according to a preferred embodiment of the present invention. A CPU 10 communicates data information with a memory consisting of dynamic RAM components 12 via a bidirectional data transfer bus 14. The CPU 10 further communicates address information via an address bus 16. The address bus 16 can consist of 23 address lines referred to herein as $A_0$ through $A_{22}$, $A_0$ representing the least significant address line and $A_{22}$ representing the most significant address line.

An address decoder 18 is of the usual type and is configured to detect when the CPU 10 generates an address within a predetermined window or range of addresses. An address within the window is interpreted by the address decoder 18 as an EMS access event and the occurrence of such event is communicated from the address decoder 18 via EMS access detect line 20. In the preferred construction, the address decoder 18 receives address lines $A_{16}$ through , shown at 22, the most significant seven address lines, and determines whether the information present on said lines corresponds to a window of 64 kilobytes in width and physically located from 832 up to 896 kilobytes.

An EMS access event defines a circumstance in which certain software and hardware elements operate to modify an address as generated by the CPU 10 prior to its being impressed upon the physical dynamic RAM components 12. The modification essentially consists of replacing upper order address information as generated by the CPU 10 with information derived from a mapping memory 30. In hardware, the replacement is achieved through the use of a multiplexer 32 of the usual type, the function of which is described more fully hereinafter.

The mapping memory 30, constructed of typical RAM components and responsive to $A_{14}$ and $A_{15}$, shown at 44, outputs mapping information 34. The mapping information 34, previously having been stored in the mapping memory 30 in accordance with an expanded memory specification, contains the raw information needed to properly modify the CPU-generated address. In its present condition, however, the mapping information 34 is unusable as replacement upper order address information, it being in a standard form insensitive to the physical location of available reserved RAM in a particular computer system.

According to the invention, therefore, a translator 36 operates on the mapping information 34 in such a way as to create translated mapping information 38 in a form usable as upper order address information. The function of the preferred embodiment of the translator 36 can best be understood with reference to FIG. 2.

Figures 2, 3:
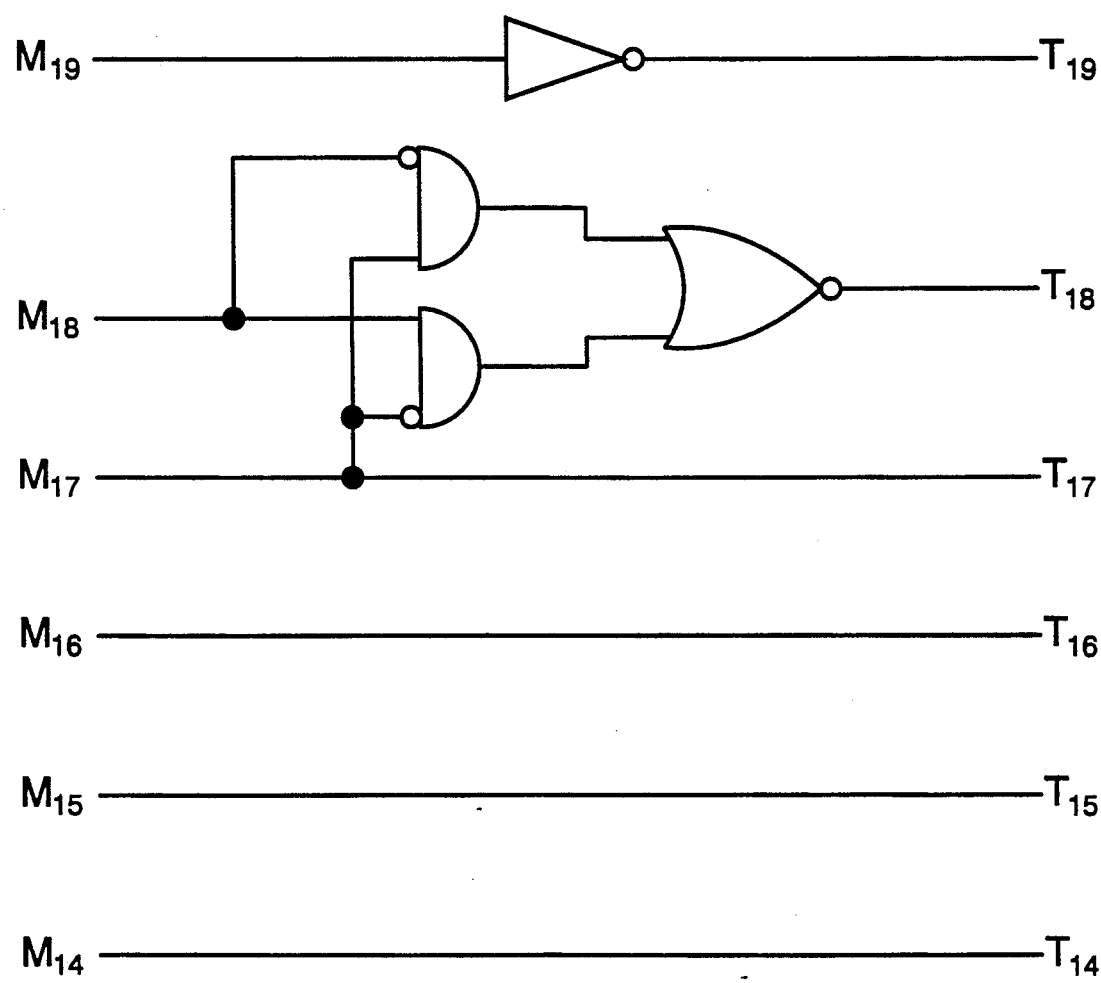
FIG. 2 is a truth table defining the function of the translator of FIG. 1 according to a preferred embodiment of the present invention.
FIG. 3 is a logic diagram illustrating a preferred embodiment of the translator of FIG. 1 which performs the function defined by the truth table of FIG. 2.

FIG. 2 depicts a truth table defining the function of the preferred translator 36. Available reserved range RAM in the preferred system can exist between the physical addresses of either 512 or 640 kilobytes up to 896 kilobytes depending upon whether the system RAM limit is configured to be 512 or 640 kilobytes. The locations from 896 kilobytes up to one megabyte of the preferred system can be occupied by specialized ROM. As can be seen from FIG. 2, the translator 36 can convert mapping information corresponding to a range of from 0 up to 256 or 384 kilobytes, depending upon whether the system RAM limit is configured to be 640 or 512 kilobytes respectively, into usable upper order address information corresponding to a range of physical locations from 896 kilobytes down to 640 or 512 kilobytes respectively. Pursuant to the invention, mapping information 34 which is provided under program control can be in a standard form, yet it can be translated to correspond to available reserved range RAM peculiar to a particular computer system.

Mapping information 34 consists of eight bits, $M_{20}$ through $M_{14}$ and a Page Enable bit, according to an expanded memory specification. $M_{20}$ through $M_{14}$ correspond in significance to $A_{20}$ through $A_{14}$ respectively. $M_{20}$ is not needed and is therefore not used for addressing reserved range memory under one megabyte. Each combination of values for $M_{19}$, $M_{18}$ and $M_{17}$ defines a block of memory 128 kilobytes in size, and $M_{16}$, $M_{15}$ and $M_{14}$ further define smaller blocks therewithin. In furtherance of the invention, the translator 36 operates on the mapping information 34 to create translated mapping information 38, $T_{19}$ through $T_{14}$, such that each combination of $T_{19}$, $T_{18}$ and $T_{17}$ shown in FIG. 2 defines a block of available reserved range RAM 128 kilobytes in size. $T_{16}$, $T_{15}$ and $T_{14}$ are not changed from $M_{16}$, $M_{15}$ and $M_{14}$ respectively, as can be seen in FIG. 3, because information of such significance merely defines locations within a 128 kilobyte block and not the location of the block itself. In other words, the function of the preferred translator 36 as described above is such that it creates translated mapping information 38 by modifying only such bits of mapping information 34 as are necessary to create usable upper order address information corresponding to the location of available reserved range RAM in the system. The translated mapping information 38 is thus available to be used as replacement upper order address information.

From FIG. 2, it is to be noted that the preferred translator 36 function can be described as inverting and offsetting the mapping information 34. In keeping with an object of the invention, the inversion is performed so as to readily accommodate a system RAM limit of either 512 or 640 kilobytes. For example, as the system RAM limit decreases from 640 to 512 kilobytes, the available reserved range RAM concurrently expands from 256 to 384 kilobytes. This is accomplished by the inversion feature of the present invention which assigns to the physical range of from 512 to 640 kilobytes mapping information corresponding to a block of from 256 to 384 kilobytes. Further, the preferred translator 36 offsets the mapping information 34 to prevent an address conflict with ROM located in the upper 128 kilobytes of the reserved range of the preferred system.

It should be understood that while the translator 36 has been described so as to operate with a preferred computer system, the function of the translator 36 as described in FIG. 2 can easily be changed to operate with a computer system having RAM located anywhere within the reserved range of addresses. The function of the preferred translator 36 as defined in FIG. 2 can be performed by the usual means such as by a combinational logic network, as shown in FIG. 3, which itself may be implemented by a programmable logic array.

Pursuant to the invention, the multiplexer 32, responsive to the EMS access detect line 20, is provided to select between CPU-generated upper order address information present on lines $A_{22}$ through $A_{19}$ shown at 40, and the translated mapping information 38 consisting of $T_{19}$ through $T_{14}$. An active EMS access detect line 20, representing an EMS access event as described above, causes the multiplexer 32 to select the translated mapping information 38, and an inactive EMS access detect line 20 causes the multiplexer 32 to select the CPU-generated upper order address information shown at 40. The selection function of the multiplexer 32 determines which of the two sources will provide the upper order addressing information eventually impressed upon the physical dynamic RAM components 12.

From the above it is seen that the multiplexer 32, responsive to the EMS access detect line 20, modifies an address as generated by the CPU 10 prior to its being impressed upon the physical dynamic RAM components 12 by replacing the CPU-generated upper order address information 40 with the translated mapping information 38 derived from the contents of the mapping memory 30 and the translator 36. It should be understood that, pursuant to the invention, CPU-generated lower order address information, present on lines $A_{13}$ through $A_0$, shown at 42, need not be subject to modification since it merely defines a particular address location within a 16 kilobyte block and not the location of that block. Accordingly, CPU-generated lower order address information 42 is directly impressed upon the physical dynamic RAM components 12.

A method and system have been disclosed for providing access to RAM located within the reserved range of addresses in a personal computer system. Prior computer systems have used 32-bit wide data transfer buses and 256-kilobit dynamic RAM components for reasons of cost and speed, despite the fact that this arrangement resulted in unusable RAM mapped within the reserved range. The present method and system provides a means of using this previously unusable RAM, whereby such RAM is mapped to EMS memory.

With the method and system of the present invention, more memory is immediately available for use, thus increasing system operating speed and reducing software development costs. In addition, one drawback of using a 32-bit wide data transfer bus in conjunction with cost effective memory devices has been solved. Furthermore, the above advantages are accomplished at a minimal cost due to the adaptation of standard EMS components and procedures.

It will be appreciated by those skilled in the art that modifications to the foregoing preferred embodiment may be made in various aspects. The present invention is set forth with particularity in the appended claims. It is deemed that the spirit and scope of that invention encompasses such modifications and alterations to the preferred embodiment as would be apparent to one of ordinary skill in the art and familiar with the teachings of the present application.

We claim:

1. A method of accessing random access memory physically located within a range of addresses reserved for other devices, said method comprising the steps of:
   generating an address within a predetermined address window, said address having upper order information and lower order information;
   retrieving mapping information previously stored in a mapping memory, said mapping information corresponding to available random access memory within said range reserved for other devices;
   translating said mapping information by converting the binary bits of said mapping information to a form in accordance with inverting said bits and then offsetting said inverted bits by a selected offset value, said translated mapping information comprising replacement upper order address information for addressing the physical location of said available random access memory within said reserved range;
   combining said translated mapping information with said lower order information to form a combination address; and
   addressing said random access memory with said combination address.

2. A method of accessing random access memory comprising the steps of:
   detecting whether an address in a computer system is within a predetermined address window, said address having upper order information and lower order information, said address within said window indicating an access to random access memory physically located within a range of addresses reserved for other devices;
   retrieving mapping information previously stored in a mapping memory, said mapping information corresponding to available random access memory within said reserved range;
   translating said mapping information by converting the binary bits of said mapping information to a form in accordance with inverting said bits and then offsetting said inverted bits by a selected offset value, said translated mapping information comprising replacement upper order address information for addressing the physical location of said available random access memory within said reserved range;
   combining said translated mapping information with said lower order information to form a combination address when said upper order information is within said predetermined address window, said combining being responsive to said detecting; and
   addressing said random access memory with said combination address.

3. The method of claim 2 wherein said selected offset value is a multiple of 64 kilobytes.

4. A method of accessing random access memory comprising the steps of:
   generating an address, said address having upper order information and lower order information;
   detecting whether said address is within a predetermined address window, said address within said window indicating an access to random access memory physically located within a range of addresses reserved for other devices;
   retrieving mapping information previously stored in a mapping memory, said mapping information corresponding to available random access memory within said reserved range;
   translating said mapping information by converting the binary bits of said mapping information to a form in accordance with inverting said bits and then offsetting said inverted bits by an offset value of 128 kilobytes, said translated mapping information comprising replacement upper order address information for addressing the physical location of said available random access memory within said reserved range;
   combining said translated mapping information with said lower order information to form a combination address when said upper order information is within said predetermined address window, said combining being responsive to said detecting; and
   addressing said random access memory with said combination address.

5. A method of accessing random access memory comprising the steps of:
   generating an address, said address having upper order information and lower order information;
   detecting whether said address is within a predetermined address window, said address within said window indicating an access to random access memory physically located within a range of addresses reserved for other devices;
   retrieving mapping information previously stored in a mapping memory, said mapping information corresponding to available random access memory within said reserved range;
   translating said mapping information by inverting the most significant bit of said mapping information to create the most significant bit of said translated mapping information, exclusive NORing the second and third most significant bits of said mapping information to create the second most significant bit of said translated mapping information and using the third, fourth, fifth and sixth most significant bits of said mapping information as the third, fourth, fifth and sixth most significant bits of said translated mapping information respectively, said translated mapping information comprising replacement upper order address information for addressing the physical location of said available random access memory within said reserved range;

combining said translated mapping information with said lower order information to form a combination address when said upper order information is within said predetermined address window, said combining being responsive to said detecting; and addressing said random access memory with said combination address.

6. An apparatus in a computer system for accessing random access memory physically located within a range of addresses reserved for other devices, said apparatus comprising:

means for generating an address within a predetermined address window, said address having upper order information and lower order information;

means for retrieving mapping information previously stored in a mapping memory, said mapping information corresponding to available random access memory within said range reserved for other devices;

means coupled to said means for retrieving, for translating said mapping information, said means for translating comprising means for converting the binary bits of said mapping information to a form in accordance with inverting said bits and then offsetting said inverted bits by a selected offset value, said translated mapping information comprising replacement upper order address information for addressing the physical location of said available random access memory within said reserved range;

means, coupled to said means for translating, for combining said translated mapping information with said lower order information to form a combination address; and means for addressing said random access memory with said combination address.

7. An apparatus in a computer system for accessing random access memory comprising:

means for generating an address, said address having upper order information and lower order information;

means, coupled to said means for generating, for decoding said upper order information of said address and for detecting whether said address is within a predetermined address window, said address within said window indicating an access to random access memory physically located within a range of addresses reserved for other devices;

means for translating mapping information previously stored in a mapping memory, said mapping information corresponding to available random access memory within said reserved range, said means for translating comprising means for converting the binary bits of said mapping information to a form in accordance with inverting said bits and then offsetting said inverted bits by a selected offset value, and said translated mapping information comprising replacement upper order address information for addressing the physical location of said available random access memory within said reserved range;

means, coupled to said means for translating and said means for decoding, for combining said translated mapping information with said lower order information to form a combination address when said upper order information is within said predetermined address window, said means for combining being responsive to said means for decoding; and means for addressing said random access memory with said combination address.

* * * * *